United States Patent Office 3,734,891
Patented May 22, 1973

3,734,891
TRANSESTERIFICATION CATALYSTS FOR PRODUCTION OF POLY ($C_4$ TO $C_{12}$ ALKYLENETEREPHTHALATE)
William N. Knopka, Wilmington, Del., assignor to FMC Corporation, Philadelphia, Pa.
No Drawing. Filed May 24, 1971, Ser. No. 146,484
Int. Cl. C08g 17/13, 17/15
U.S. Cl. 260—75 R
18 Claims

ABSTRACT OF THE DISCLOSURE

The process of preparing a poly($C_4$ to $C_{12}$ alkyleneterephthalate) resin comprising carrying out a transesterification reaction between a $C_4$ to $C_{12}$ alkylene glycol and a lower dialkyl terephthalate in the presence of a transesterification catalyst represented by the formula $M_xTiF_6$, wherein M is a $NH_4$-radical, an alkali metal or alkaline earth metal, to form a prepolymer and then polycondensing said prepolymer.

This invention relates to a process for preparing bis(hydroxy-$C_4$ to $C_{12}$ alkyl) terephthalates and to the highly polymeric polycondensation resinous products thereof. The manufacture of bis(hydroxy-$C_4$ to $C_{12}$ alkyl) terephthalate prepolymers and their polycondensation products, poly($C_4$ to $C_{12}$ alkyleneterephthalates) are known in the art. In the ester interchange, or transesterification method of preparing such products, for example, a lower dialkyl terephthalate such as dimethyl terephthalate and a suitable glycol such as 1,4-butanediol are first combined and then subjected to a transesterification reaction in the presence of a catalyst at elevated temperature and at atmospheric pressure. The resulting prepolymer product or bis(4-hydroxybutyl) terephthalate is then polycondensed to form poly(tetramethylene terephthalate) resin.

Various catalysts and combination thereof have been suggested for catalyzing the transesterification reaction between lower alkyl dicarboxylates and glycols encompassing the lower dialkyl terephthalates and $C_4$ to $C_{12}$ alkylene glycols [$HO(CH_2)_nOH$ wherein $n$ is 4 to 12], used in the process of the present invention. From a commercial standpoint, it is preferred that the polyester prepolymer as well as the resulting polyester resin be produced in the shortest possible time and that the desired degree of ester interchange and polycondensation being consecutively obtained. In general, it is considered that a poly($C_4$ to $C_{12}$ alkyleneterephthalate) resin, for example, poly(tetramethylene terephthalate) resin suitable for melt spinning into films and filaments should have a carboxyl content value of below 50 equivalents per million grams (eq./$10^6$ gr. or meq./kg.). Additionally, such a resin should have a sufficiently high melting point so that the resin will be suitable for film or fiber use and an intrinsic viscosity preferably not less than 0.50 when determined in a 60% phenol-40% tetrachloroethane solution, wt./wt., at 30° C.

The most convenient way of evaluating the effectiveness of a transesterification catalyst is by measuring the "half-time" of the catalyst. The "half-time" is defined as the time necessary for the first one-half of the theoretical amount of alkanol that will be produced during the transesterification reaction to distill from the reaction mixture. Obviously, for economic reasons, as well as other reasons relating to quality of product, it is desired that the "half-time" be as short as possible.

In discussing useful transesterification catalysts, the prior art, in many instances, suggests that a particular transesterification catalyst can be used to catalyze the reaction between any dialkyl terephthalate and alkylene glycol having from 2 to 10 carbon atoms. However, it has been found that the transesterification catalysts suggested in the prior art do not in fact satisfactorily catalyze the reaction between $C_4$ to $C_{12}$ alkylene glycols and lower dialkyl ($C_1$ to $C_4$) terephthalates at a sufficient rate to be acceptable for modern commercial production. In addition, the use of transesterification catalysts disclosed in the prior art for such reactions often result in the formation or stimulation of undesirable side reactions.

For example, in the preparation of the prepolymer bis(4-hydroxybutyl) terephthalate where dimethyl terephthalate is heated with 1,4-butanediol in the presence of 0.04 wt. percent of manganous acetate $$[Mn(C_2H_3O_2)_2]$$

at 200° C., only 46% of the distillate (methanol) is produced in 200 minutes. Whereas, in the preparation of bis(2-hydroxyethyl)terephthalate, this level of manganous acetate catalysts would, according to past experience, result in a "half-time" of about 20 minutes. In the transesterification reaction between dimethyl terephthalate and 1,4-butanediol increasing the concentration of manganous acetate to 0.1 wt. percent based on the dimethyl terephthalate does increase the rate of reaction as judged by the formation of the alkanol distillate. Such increase in catalyst concentration, however, results in the formation of a prepolymer which contains high percentage of methoxyl groups. A high concentration of methoxyl groups indicates an incomplete transesterification. In addition, the heating of bis(4-hydroxybutyl)terephthalate for extended periods of time in the presence of such high concentrations of catalysts in an attempt to drive the transesterification reaction to completion results in the formation of tetrahydrofuran as a by-product. The presence of excessive concentrations of tetrahydrofuran can produce an unsafe condition since this material readily forms peroxides. Further, excessive concentrations of tetrahydrofuran during the precondensation stage will have an adverse effect on retaining the desired vacuum.

It is an object of the present invention to prepare bis(hydroxy-$C_4$ to $C_{12}$ alkyl) terephthalate prepolymers and to polycondense said prepolymers to form the corresponding polyester.

It is another object of this invention to prepare poly($C_4$ to $C_{12}$ alkyleneterephthalate) resins with minimal side reactions and a short reaction period.

It is a further object of the present invention to prepare highly polymeric poly($C_4$ to $C_{12}$ alkyleneterephthalate) resins which are suitable for filament- and film-forming purposes.

These and other objects are accomplished in accordance with the present invention which involves a method of preparing highly polymeric poly($C_4$ to $C_{12}$ alkyleneterephthalate) resins wherein a $C_4$ to $C_{12}$ alkylene glycol [$HO(CH_2)_nOH$ wherein $n$ is an integer of from 4 to 12], and a lower dialkyl ($C_1$ to $C_4$) terephthalate are transesterified to form a polyester prepolymer and then the resulting prepolymer is polycondensed, the improvement comprising carrying out the transesterification reaction in the presence of a catalytic amount of a catalyst selected from the group consisting of those represented by the Formula A $M_xTiF_6$ wherein M is selected from the group consisting of a $NH_4$-radical, an alkali metal or an alkaline earth metal, $x$ is 2 where M is monovalent and $x$ is 1 where M is bivalent.

In accordance with the process of the present invention, the subject poly($C_4$ to $C_{12}$ alkyleneterephthalate) resins can be prepared by using one or more of the above disclosed catalysts for carrying out both the transesterification reaction and polycondensation of the resulting prepolymer to form the desired highly polymeric resin. Therefore, only one of the above suggested catalysts need be added at the beginning of the transesterification reaction and the same catalyst will also function as a polycondensation catalyst in the present process.

In carrying out the present process, other catalysts selected from the group consisting of a lithium, calcium, lead, zinc or manganese salt of a $C_2$ to $C_6$ aliphatic monocarboxylic acid, zinc oxide and lead oxide can be combined with the above catalyst represented by Formula A to obtain the desired results.

Among the catalysts coming within the above description which can be used in carrying out the present process are diammonium hexafluorotitanate, calcium hexafluorotitanate, dilithium hexafluorotitanate and disodium hexafluorotitanate. As stated above, other catalyst compounds which can be used in combination with the cited hexafluorotype compound if indicated are, for example, lead acetate, lead oxide, lithium acetate, zinc oxide, calcium acetate and manganous acetate.

In general, it has been determined in accordance with the present process that the above described catalysts are effective when used in concentrations ranging from about 0.005% to 0.2% based on the weight of the dialkyl terephthalate in the initial reaction mixture used. In view of reaction rates and products obtained, it has been found that from about 0.01% to 0.1% of the present catalysts, based on the weight of the dialkyl terephthalate in the reaction mixture, is preferred to produce the filament- and film-forming polyesters of the present method. The above weight percent ranges of catalysts pertains to total catalyst compound content regardless of whether one or more catalyst compounds are used. Higher or lower concentrations of the present catalysts can also be used when indicated. However, if concentrations less than the above are used, the catalytic effect is generally reduced proportionally whereas if greater concentrations are used, no further improvement in the present method or desired product is obtained.

It has been determined when a catalyst identified by Formula A above is used in combination with a lithium, calcium, lead, zinc or manganese salt of a $C_2$ to $C_6$ aliphatic monocarboxylic acid, zinc oxide or lead oxide that such a combination is effective when used in ratios no greater than 8:1. However, it is preferred that the ratio of this catalyst combination be no greater than about 4:1 in view of obtaining optimum results.

In general, the preparation of the filament-forming polyesters of the present invention via the ester-interchange reaction is carried out with a molar ratio of a $C_4$ to $C_{12}$ alkylene glycol [$HO(CH_2)_{4-12}OH$] to dialkyl ($C_1$ to $C_4$) terephthalate of from about 1:1 to about 15:1 but preferably from about 1.2:1 to about 2.6:1. The ester-interchange reaction is generally carried out at atmospheric pressure in an inert atmosphere, such as nitrogen, initially, at a temperature range of from about 125° C. to about 250° C but preferably between about 175° C and 225° C in the presence of one or more of the above disclosed ester interchange catalysts. During this stage of the reaction, an alkanol is evolved, depending on the particular dialkyl terephthalate utilized, and is continually removed by distillation. After a reaction period of about one hour, the temperature is normally up to about 200° C. at which approximate temperature the reaction will be maintained until the transesterification is complete as indicated by the production of the alkanol by-product. The second or polycondensation step of the present process is generally achieved under reduced pressure of about 0.05 to 20 mm. of mercury within the range of from about 225° C. to 325° C. for 2 to 4 hours.

Among the $C_4$ to $C_{12}$ alkylene glycols which can be used in the present process are 1,4-butanediol, 1,5-pentanediol, 1,6-hexanediol, 1,8-octanediol, 1,10-decanediol and 1,12-dodecanediol.

Among the lower dialkyl ($C_1$ to $C_4$) terephthalates that can be used as a reactant in the present process are, for example, dimethyl terephthalate and dibutyl terephthalate.

The following examples of preferred embodiments of the present invention will further serve to illustrate the present invention.

EXAMPLES 1–21

A 250 ml. reaction vessel equipped with a three necked top with a stirrer, thermometer and Claisen distilling head with condenser was successively charged with 97 grams (0.5 mole) of dimethyl terephthalate, 108 grams (1.2 mole) of 1,4-butanediol (except Examples 6, 9 and 14 wherein the weights of reactants were 48.5 grams and 54 grams respectively and Examples 20 and 21 wherein the weights of reactants were 97 grams and 103.5 grams respectively) and a transesterification catalyst as listed in the following table with percent concentration thereof used. The reaction mixtures while being agitated at atmospheric pressure were heated up to about 200° C. over a period of about 20 minutes. Then, the reaction temperature was maintained at about 200° C. until methanol ceased distilling. The prepolymer products, bis(4-hydroxybutyl)terephthalate, were allowed to cool under an atmosphere of nitrogen.

The "half-time" of the catalysts given in the following table and examples were measured from the appearance of the first drop of methanol distillate until one-half of the theoretical amount of methanol by-product was collected.

Some of the above prepared prepolymers, as indicated in the following table, were polycondensed to form poly(tetramethylene terephthalate) without the addition of other catalysts. The prepolymers were polycondensed by placing same in a suitable reactor and applying heat along with reducing the pressure within the reaction vessel to 0.2 mm. mercury over an approximately five hour period. After the pressure was reduced to 5.0 mm. of mercury, the reaction mixture was heated to 240° C. and maintained at this temperature for about two hours to form poly(tetramethylene terephthalate). The properties of the resins produced are listed in the following table.

TABLE

| Example No. | Transesterification catalyst | Weight percent catalyst used [1] | T ½ [2] | Prepolymer methoxyl content [3] | Prepolymer carboxyl content (meq.k/g.) [5] | Polymer melting point, °C. | Polymer carboxyl content [5] (meq./kg.) | P.B.T., I.V. [4] | Polymer color |
|---|---|---|---|---|---|---|---|---|---|
| 1 | Pb($C_2H_3O_2$)$_2$·3$H_2O$ / ($NH_4$)$_2$Ti$F_6$·2$H_2O$ | 0.04 / 0.01 | 15.6 | 0.27 | 159 | 230 | 3.9 | 0.63 | White. |
| 2 | PbO / ($NH_4$)$_2$Ti$F_6$·2$H_2O$ | 0.04 / 0.01 | 15.6 | 0.28 | 135 | 221 | 4.3 | 0.72 | Do. |
| 3 | Zn($C_2H_3O_2$)$_2$·2$H_2O$ / ($NH_4$)$_2$Ti$F_6$·2$H_2O$ | 0.04 / 0.01 | 17.1 | 0.46 | 135 | 230 | 8.7 | 0.88 | Do. |
| 4 | ZnO / ($NH_4$)$_2$Ti$F_6$·2$H_2O$ | 0.04 / 0.01 | 16.0 | 0.46 | 118 | 229 | 14.0 | 0.92 | Do. |
| 5 | Ca($C_2H_3O_2$)$_2$·2$H_2O$ / ($NH_4$)$_2$Ti$F_6$·2$H_2O$ | 0.04 / 0.01 | 11.8 | 0.17 | 102 | 227 | 4.0 | 0.76 | Do. |
| 6 | Mn($C_2H_3O_2$)$_2$ / ($NH_4$)$_2$Ti$F_6$·2$H_2O$ | 0.04 / 0.01 | 15.9 | 0.33 | 139 | 225 | 8.0 | 0.54 | Do. |
| 7 | Mn($C_2H_3O_2$)$_2$ / ($NH_4$)$_2$Ti$F_6$·2$H_2O$ | 0.03 / 0.01 | 20.1 | 0.61 | 165 | | | | |
| 8 | Mn($C_2H_3O_2$)$_2$ / ($NH_4$)$_2$Ti$F_6$·2$H_2O$ | 0.01 / 0.01 | 21.8 | 0.56 | 151 | 231 | 3.0 | 0.68 | Do. |
| 9 | Mn($C_2H_3O_2$)$_2$ | 0.04 | >200 | 8.71 | 189 | | | | |
| 10 | CaTi$F_6$ | 0.01 | 28.8 | 0.10 | 108 | 221 | 3.0 | 0.48 | Do. |
| 11 | Li$_2$Ti$F_6$ | 0.01 | 17.3 | 0.44 | 161 | 224 | 4.0 | 0.59 | Do. |
| 12 | Na$_2$Ti$F_6$ | 0.01 | 37.8 | 0.94 | 238 | | | | |
| 13 | ($NH_4$)$_2$Ti$F_6$·2$H_2O$ | 0.04 | 21.3 | 0.10 | 115 | | | | |
| 14 | ($NH_4$)$_2$Ti$F_6$·2$H_2O$ | 0.01 | 23.1 | 0.02 | 179 | 226 | 3.0 | 0.73 | Do. |
| 15 | Mn($C_2H_3O_2$)$_2$ / Li$_2$Ti$F_6$ | 0.04 / 0.01 | 15.8 | 0.91 | 106 | 223 | 8.0 | 0.70 | Do. |
| 16 | Pb($C_2H_3O_2$)$_2$·3$H_2O$ / CaTi$F_6$ | 0.04 / 0.01 | 17.2 | 1.53 | 138 | 225 | >3.0 | 0.67 | Do. |
| 17 | Pb($C_2H_3O_2$)$_2$·3$H_2O$ / Li$_2$Ti$F_6$ | 0.04 / 0.01 | 18.7 | 1.15 | 131 | | | | |
| 18 | Mn($C_2H_3O_2$)$_2$ / CaTi$F_6$ | 0.04 / 0.01 | 28.0 | 1.42 | 139 | 224 | 9.0 | 0.68 | Do. |
| 19 | Ca($C_2H_3O_2$)$_2$·2$H_2O$ / CaTi$F_6$ | 0.04 / 0.01 | 32.4 | 0.91 | 134 | | | | |
| 20 | Mn($C_2H_3O_2$)$_2$ / ($NH_4$)$_2$Ti$F_6$·2$H_2O$ | 0.01 / 0.04 | 18.0 | 0.27 | 64 | | | | |
| 21 | Mn($C_2H_3O_2$)$_2$ / ($NH_4$)$_2$Ti$F_6$·2$H_2O$ | 0.04 / 0.005 | 24.8 | 1.0 | 184 | | | | |
| 22 | Li($C_2H_3O_2$) / Li$_2$Ti$F_6$ | 0.04 / 0.01 | 24.5 | 0.77 | 109 | 222 | 7.0 | 0.59 | Do. |

[1] Weight percent of catalyst used based on weight of dimethyl terephthalate in reaction mixture.
[2] Half-time of catalyst in minutes.
[3] Methoxyl value=weight percent based on prepolymer.
[4] P.B.T.=Poly(tetramethylene terephthalate). I.V.=Intrinsic viscosity.
[5] Free carboxyl value=equivalents per million grams or meq./kg.

EXAMPLE 23

A 250 ml. reaction vessel equipped with a three necked top with a stirrer, thermometer, and Claisen distilling head with condenser was charged with 48.5 grams (0.25 mole) dimethyl terephthalate, 68 grams (0.575 mole) 1,6-hexanediol and 0.0050 grams (0.01 weight percent) ($NH_4$)$_2$Ti$F_6$·2$H_2O$. The reaction mixture while being agitated at atmospheric pressure was heated up to about 198° C. over a period of about 60 minutes and maintained at a temperature between about 198° C. to 202° C. for about 200 minutes when methanol ceased distilling. The prepolymer product bis(6-hydroxyhexyl)terephthalate was then allowed to cool under an atmosphere of nitrogen. The "half-time" of this reaction was 20.3 minutes. The prepolymer produced had a methoxyl content (wt. percent) of 0.02 and a carboxyl content of 3 meq./kg.

EXAMPLE 24

A 250 ml. reaction vessel as used in Example 23 was charged with 48.5 grams dimethyl terephthalate, 100 grams (0.575 mole) 1,10-decanediol and 0.0049 grams (0.01 weight percent) ($NH_4$)$_2$Ti$F_6$·2$H_2O$. The reaction mixture while being agitated at atmospheric pressure was heated up to about 195° C. over a period of about 60 minutes and maintained at a temperature between about 195° C. to 201° C. for about 203 minutes when methanol ceased distilling. The prepolymer product bis(10-hydroxydecyl) terephthalate was then allowed to cool under an atmosphere of nitrogen. The "half-time" of this reaction was 17.6 minutes. The prepolymer product produced had a methoxyl content (wt. percent) of 0.09 and a carboxyl content of 3 meq./kg.

EXAMPLE 25

A 250 ml. reaction vessel as used in Example 23 was charged with 97 grams (0.5 mole) dimethyl terephthalate, 114 grams (1.1 moles) 1,5-pentanediol and 0.0099 gram (0.01 weight percent) ($NH_4$)$_2$Ti$F_6$·2$H_2O$. The reaction mixture while being agitated at atmospheric pressure was heated up to about 198° C. over a period of about 60 minutes and maintained at about 198° C. for 153 minutes when methanol ceased distilling. The prepolymer product bis(5 - hydroxypentyl)terephthalate was then allowed to cool under an atmosphere of nitrogen. The "half-time" of this reaction was 21.2 minutes. The prepolymer product produced had a methoxyl content of 0.08 and a carboxyl content of 7 meq./kg.

EXAMPLE 26

A transesterification reaction was carried out using the same process as used in Example 23 except the charge was 40.7 grams (0.21 mole) dimethyl terephthalate, 100.0 grams (0.495 mole) 1,12-dodecanediol and 0.01 weight percent ($NH_4$)$_2$Ti$F_6$·2$H_2O$ based on dimethyl terephthalate content. The "half-time" of this reaction was 23.2 minutes. The prepolymer product bis(12-hydroxydodecyl)terephthalate had a methoxyl content of 1.35 and a carboxyl content of 3 meq./kg.

The intrinsic viscosity values set forth in the above examples were determined in a 60% phenol-40% tetrachloroethane solution, wt./wt., at 30° C. The other analytical values set forth above were obtained by conventional laboratory procedures.

The results of the above examples indicate that the presence of catalysts represented by the Formula A above by themselves or in combination with the other cited catalysts are very effective in catalyzing the transesterification and polycondensation steps of the present method. The polyester products of the present invention possess high molecular weights, as indicated by their intrinsic viscosities, which make them particularly well suited for fiber-forming purposes.

I claim:
1. In a process of preparing a poly($C_4$ to $C_{12}$ alkyleneterephthalate) wherein a lower dialkyl terephthalate and a $C_4$ to $C_{12}$ alkylene glycol is transesterified to form a prepolymer, and then the said prepolymer is polycondensed, the improvement comprising carrying out the transesterification reaction in the presence of a catalytic amount of a catalyst selected from the group consisting of those represented by the Formula A $M_xTiF_6$ wherein M is selected from the group consisting of a $NH_4$-radical, an alkali metal or an alkaline earth metal, $x$ is 2 where M is monovalent and $x$ is 1 where M is bivalent.

2. The process of claim 1 where both the transesterification and polycondensation reactions are carried out in the presence of a catalyst represented by the Formula A.

3. In a process of preparing a poly($C_4$ to $C_{12}$ alkyleneterephthalate) wherein a $C_4$ to $C_{12}$ alkylene glycol and a lower dialkyl terephthalate are transesterified to form a prepolymer and then the resulting prepolymer is polycondensed, the improvement comprising carrying out the said transesterification in the presence of a catalytic amount of a catalyst selected from the group consisting of those represented by the Formula A $M_xTiF_6$ wherein M is selected from the group consisting of a $NH_4$-radical, an alkali metal or an alkaline earth metal, $x$ is 2 where M is monovalent and $x$ is 1 where M is bivalent, or a combination of a compound (A) above with a compound selected from the group consisting of a lithium, calcium, lead, zinc or manganese salt of a $C_2$ to $C_6$ aliphatic monocarboxylic acid, zinc oxide and lead oxide.

4. A process of claim 1 wherein the lower dialkyl terephthalate is dimethyl terephthalate and the alkylene glycol is 1,4-butanediol.

5. A process of claim 2 wherein the lower dialkyl terephthalate is dimethyl terephthalate and the alkylene glycol is 1,4-butanediol.

6. A process of claim 3 wherein the lower dialkyl terephthalate is dimethyl terephthalate and the alkylene glycol is 1,4-butanediol.

7. A process of claim 4 wherein the catalyst is present at a concentration ranging from about 0.01 to 0.1 weight percent based on the dimethyl terephthalate content.

8. A process of claim 5 wherein the catalyst is present at a concentration ranging from about 0.01 to 0.1 weight percent based on the dimethyl terephthalate content.

9. A process of claim 6 wherein the catalyst is present at a concentration ranging from about 0.01 to 0.1 weight percent based on the dimethyl terephthalate content.

10. A process of claim 3 wherein the catalyst combination is present at a ratio of about 8:1.

11. A process of preparing bis(4-hydroxybutyl)terephthalate comprising carrying out a transesterification reaction between 1,4-butanediol and dimethyl terephthalate in the presence of a catalytic amount of a catalyst selected from the group represented by the Formula A $M_xTiF_6$ wherein M is selected from the group consisting of a $NH_4$-radical, an alkali metal or an alkaline earth metal, $x$ is 2 where M is monovalent and $x$ is 1 where M is bivalent, or a combination of a compound (A) above with a compound selected from the group consisting of a lithium, calcium, lead, zinc or manganese salt of a $C_2$ to $C_6$ aliphatic monocarboxylic acid, zinc oxide and lead oxide.

12. A process of claim 6 wherein the catalyst is a combination of zinc acetate and diammonium hexafluorotitanate.

13. A process of claim 6 wherein the catalyst is a combination of manganese acetate and diammonium hexafluorotitanate.

14. A process of claim 6 wherein the catalyst is diammonium hexafluorotitanate.

15. A process of claim 11 wherein the catalyst is diammonium hexafluorotitanate.

16. A process of claim 11 wherein the catayst is a combination of zinc acetate and diammonium hexafluorotitanate.

17. A process of claim 11 wherein the catalyst is a combination of manganous acetate and diammonium hexafluorotitanate.

18. A process of claim 3 wherein both the transesterification and polycondensation reactions are catalyzed by the same catalyst or catalyst combination.

References Cited

UNITED STATES PATENTS

| | | | |
|---|---|---|---|
| 2,744,094 | 5/1956 | Caldwell | 260—75 |
| 3,356,641 | 12/1967 | Roedel et al. | 260—45.75 |
| 3,385,830 | 5/1968 | vomOrde et al. | 260—75 |
| 3,386,960 | 6/1968 | Wiener | 260—75 |
| 3,410,829 | 11/1968 | Jeurissen et al. | 260—75 |
| 3,457,239 | 7/1969 | Stewart et al. | 260—75 |
| 3,523,104 | 8/1970 | Dobinson | 260—75 |
| 3,528,946 | 9/1970 | Stewart et al. | 260—75 |
| 3,532,671 | 10/1970 | Carlson et al. | 260—75 |
| 3,554,977 | 1/1971 | Carter | 260—75 |
| 3,554,978 | 1/1971 | Carter et al. | 260—75 |

FOREIGN PATENTS

| | | |
|---|---|---|
| 577,788 | 6/1959 | Canada. |
| 19,953 | 8/1969 | Japan. |

OTHER REFERENCES

Kirk-Othmer: Encycl. Chem. Technol., vol. 8, 361 (1965), vol. 16, 175(1968).

MELVIN GOLDSTEIN, Primary Examiner

U.S. Cl. X.R.

260—475P